United States Patent [19]

Hull et al.

[11] 3,904,480

[45] Sept. 9, 1975

[54] ENHANCED PRODUCTION OF PLASMINOGEN ACTIVATOR

[75] Inventors: Robert N. Hull, Greenwood, Ind.; Rolf M. Huseby, Miami, Fla.

[73] Assignee: Eli Lilly and Company, Indianapolis, Ind.

[22] Filed: July 3, 1974

[21] Appl. No.: 485,489

Related U.S. Application Data

[63] Continuation-in-part of Ser. No. 300,054, Oct. 24, 1972, abandoned.

[52] U.S. Cl. ................................ 195/66 B; 195/1.7
[51] Int. Cl. ............................................ C07g 7/026
[58] Field of Search .................... 195/66 B, 1.7, 1.8

[56] References Cited
OTHER PUBLICATIONS

Arthritis and Rheumatism, Vol. 14, No. 6 (Nov.–Dec. 1971) pp. 669–684, article by Harris et al. entitled "Effects of Colchicine on Collogenase in Cultures of Rheumatoid Synovium."

*Primary Examiner*—Lionel M. Shapiro
*Attorney, Agent, or Firm*—William B. Scanlon; Everet F. Smith

[57] ABSTRACT

Enhanced plasminogen activator yields are obtained by culturing plasminogen activator producing mammalian tissue cells in an aqueous nutrient culture medium until cells have attained development to confluency or maximum population density; continuing incubation in the presence of an antimitotic agent, e.g., podophylotoxin, colchicine and derivatives thereof, vincristine, vinblastine and derivatives thereof; recovering the activator from the separated aqueous culture medium by adsorption on hydroxyapatite and elution therefrom; and purifying the activator via salt precipitation followed by DEAE cellulose chromatography and gel filtration chromatography. Plasminogen activator is provided in clinically useful amounts for treatment of thromboembolic conditions.

24 Claims, No Drawings ically useful quantities by the tissue
ENHANCED PRODUCTION OF PLASMINOGEN ACTIVATOR This application is a continuation-in-part of copending application Ser. No. 300,054 filed Oct. 24, 1972 now abandoned.

BACKGROUND OF THE INVENTION

This invention relates to a method for the production of plasminogen activator. In particular this invention relates to a method for the enhanced production of plasminogen activator which comprises culturing mammalian tissue cells in the presence of certain plant derived antimitotic agents, for example, podophylotoxin, colchicine, colchicine derivatives, vincristine, vinblastine and certain derivatives of vinblastine.

It has been recognized for some time that the blood of warm blooded mammals contains a factor known as plasminogen (profibrinolysin) which, upon activation in vivo or in vitro, produces a factor known as plasmin (fibrinolysin) which, as its name implies, lyses fibrin as it occurs in blood clots. Streptokinase, an enzyme produced by hemolytic streptococci, and urokinase, obtained from mammalian urine are two known plasminogen activating substances which are useful in the treatment of thromboembolic disorders.

It has also been known for some time that animal and human tissue cells produce and contain a substance which is capable of activating plasminogen. Illustratively, T. Astrup, and P. Permin, Nature, 159, 681 (1947); C. H. Lack and S. Yousuf Ali, Nature, 201, 1031 (1964). H. Painter, et al., Amer. Physiol., 202, 1125 (1962) and E. V. Barnett, Proc. Soc. Exp. Biol. Med., 103, 308 (1959) have produced plasminogen activating substances from primary cells as well as established line cells of various animal tissue. Previous methods for the preparation of plasminogen activator from mammalian cells are unsatisfactory for the production of clinical quantities. Such methods have described preparations of low titers which are ill-defined and impure but which demonstrate the desired activating activity as evidenced by fibrinolysis.

It is an object of this invention to provide a method for the production of plasminogen activator in enhanced yields. In particular, it is an object of this invention to provide a method for the production of plasminogen activator in clinically useful quantities by the tissue culture method. It is a further object to provide a method for isolating and purifying plasminogen activator produced by the tissue culture method.

SUMMARY OF THE INVENTION

Plasminogen activator producing mammalian cells and plasminogen activator producing cells of established mammalian cell lines are cultured in an aqueous nutrient tissue culture medium until the cells of the culture have developed to confluency or to maximum population density. An antimitotic agent selected from the group consisting of podophylotoxin, colchicine, desacetylcolchicine, desacetamidocolchicine, N-desacetyl-N-methylcolchicine, 4-cyanocolchicine, vincristine, vinblastine, vinblastine N-methylamide and desacetylvinblastine amide is added to the tissue culture medium at a concentration between about 0.1 and about 10 mcg./ml. of culture medium and the incubation of the culture is continued for between about 4 and 14 days. The plasminogen activator which is produced during the incubation and culturing of the mammalian cells is recovered from the culture by first separating insoluble cell solids and debris, and adjusting the ionic concentration of the plasminogen activator containing medium to a concentration at which the activator is quantitatively adsorbed on hydroxyapatite. Following the adjustment of the ionic concentration of the medium, between about 8 and 12 g of hydroxyapatite per liter of culture medium is added. The suspension of hydroxyapatite is stirred for between about 1 and 24 hours, and preferably for about 2 hours, during which time the plasminogen activator is adsorbed on the hydroxyapatite. The hydroxyapatite is separated from the spent medium by filtration, centrifugation or decantation and is washed with distilled water and phosphate buffer at pH 6. The plasminogen activator is then eluted from the washed hydroxyapatite with 0.7 molar phosphate buffer maintained at pH 6.8. The eluate containing the plasminogen activator is cooled to a temperature of about 5°–15° C. and to the cold solution is added a salt such as ammonium sulfate, sodium sulfate, ammonium chloride, sodium chloride, and the like, to obtain a concentration of the salt of about 20 percent of saturation. The precipitate of extraneous protein which forms is filtered, and the salt concentration of the cold filtrate is brought to about 50 percent of saturation to precipitate the plasminogen activator. The precipitated activator is dissolved in water or 0.005 M phosphate buffer, pH 6.0, and the solution is dialyzed to remove inorganics. The active plasminogen activator dialysate is purified by chromatography over diethylaminoethyl cellulose to remove additional extraneous proteinaceous impurities. The plasminogen activator is precipitated from the combined activator-containing eluate fractions by the addition of a salt such as ammonium sulfate to the eluate to obtain a salt concentration of about 75 percent of saturation. The activator precipitates quantitatively.

The precipitate of activator is further purified by gel chromatography in 0.1 M trishydroxymethylaminomethane-- 0.1 M potassium chloride buffer at pH 8.0.

The present method for producing plasminogen activator affords purified material suitable in the treatment of various thromboembolic conditions.

DETAILED DESCRIPTION OF THE INVENTION

According to the present invention there is provided a method for enhancing the yields of plasminogen activator produced by activator producing mammalian cells which comprises cultivating in an aqueous nutrient tissue culture medium containing assimilable sources of nitrogen, carbon and inorganic salts, plasminogen activator producing mammalian cells to confluency or to maximum population density; contacting the cells at such growth stage with an antimitotic agent selected from the group consisting of podophylotoxin, colchicine, desacetylcolchicine, desacetamidocolchicine, N-desacetyl-N-methylcolchicine, 4-cyanocolchicine, vincristine, vinblastine, vinblastine N-methylamide and desacetylvinblastine amide; adsorbing the plasminogen activator present in the tissue culture medium on hydroxyapatite; separating the hydroxyapatite from the spent tissue culture medium; eluting the plasminogen activator from the hydroxyapatite and purifying the activator by dialysis and chromatography.

The present method can be employed for obtaining enhanced yields of plasminogen activator by employing mammalian cells capable of producing plasminogen activator and, preferably, plasminogen activator producing established tissue cell lines. Preferred mammalian cell-cultures of the present invention are the following established cell lines:

The porcine kidney cell line designated as PK (15); ATCC NO. CCL 33 PK (15).

The porcine kidney cell line designated as LLC-PK$_1$-(Hull); ATCC No. CL 101.

The rabbit kidney cell line designated as LLC-RK$_1$-(Hull); ATCC No. CCL 106.

The rhesus monkey kidney cell line designated as LLC-MK$_2$(Hull); ATCC No. CCL 7.

The rhesus monkey kidney cell line derived from the foregoing cell line and which is designated as LLC-MK$_2$; ATCC No. CCL 7.1.

The porcine kidney cell line designated as LLC-PK$_{1,4}$; ATCC No. CL 101.1.

Although certain cell lines are preferred in the present method, other mammalian cells which produce plasminogen activator can be employed in the process described herein.

The above named established cell lines which are preferred mammalian cells in the present method, have been deposited in the permanent culture collection maintained by the American Type Culture Collection, 12301 Park Lawn Drive, Rockville, Md. 20852.

Especially preferred mammalian tissue cells of the present invention are those designated above as the porcine kidney cell line, LLC-PK$_1$ (Hull) and the subline LLC-PK$_{1,4}$ and others.

According to the method of this invention, plasminogen activator is prepared by culturing a plasminogen activator producing cell and preferably one of the cell lines designated above, in a nutrient tissue culture medium containing assimilable sources of nitrogen, carbon and inorganic salts at a temperature between about 20° and 38° C. The media employed in the present method can be any of a wide variety of those media employed in culturing tissue cells. For example, the aqueous nutrient media can contain sources of nitrogen, for example, the natural amino acids such as 1-arginine, 1-histidine, 1-lysine, 1-tyrosine, 1-tryptophane, 1-methionine, 1-serine, glycine, cysteine, and like natural amino acids; carbohydrates, for example, glucose, inositol, ribose, desoxyribose, and like sugars; and various salts capable of supplying the ions of sodium, potassium, chloride, ferric, ferrous, cobalt, calcium, phosphate, carbonate, and like ions. Also numerous essential trace elements can be added to the tissue culture medium; however, such trace elements commonly are added concurrently in sufficient quantities along with the other ingredients employed in a tissue culture medium.

The medium is buffered to maintain the pH between about 7 to 7.6. A particularly useful buffering agent is sodium bicarbonate which also serves as a source of carbonate ion.

Any of the wide variety of media employed in the tissue culture art can be employed in the present method; all that is essential is that a medium capable of supplying the required nutrients for cell growth and development be present in the medium selected. One such medium is designated as medium 199, which is prepared according to the method of Morgan, Morton, and Parker, Proc. Soc. Exp. Bio. Med., 73, 1 (1950). Another medium useful in the present method is that designated as Waymouth's medium MD 705/1. Such media can be altered to advantage, for example, by adding additional vitamins, minerals, carbohydrates, and amino acids. Likewise, the tissue culture medium can be fortified with between about 0.5 and about 10 percent by volume of a mammalian serum. Mammalian sera have a beneficial effect on the growth and development of mammalian cells, and generally any serum, for example, pig serum, horse serum and fetal bovine serum can be used to enhance the growth of cells. Sera which do not adversely affect the production of plasminogen activator are preferred. However, sera which do inhibit the production of plasminogen activator can be employed in the method of this invention in the preliminary or growth stage of the cells and can thereafter be removed prior to the addition of one of the above named antimitotic agents. For example, fetal bovine serum (FBS) is a highly beneficial serum useful for the fortification of the tissue culture medium during the growth and development of the cells. However, FBS exerts a deleterious effect on the yields of plasminogen activator when present in the culture medium. Accordingly, when an inhibitory serum such as FBS is employed in the growth medium, the medium is replaced with a medium fortified with a non-inhibitory serum, such as horse serum, and the incubation of the cells is continued therein for about 2 to 3 days prior to the addition of the antimitotic agent.

The tissue culture medium can also be fortified with sources of protein, proteoses, peptone or peptides such as enzymatic digests of beef or casein. One such protein source is an enzymatic digest of beef known as Janel.

In order to suppress any bacterial contamination of the tissue culture, it is common practice to incorporate in the tissue culture medium an antibacterial agent. Particularly useful are the antibiotics, such as streptomycin and the penicillins.

The culturing of the cells employed in the present invention is carried out in a conventional manner, for example in bottles, tubes, jars, flasks or stainless steel tanks, which vessels can be shaken or rotated on a rotary shaker or stirred to provide agitation if desired or necessary. A preferred vessel for growing monolayer cultures is a tubular vessel which is rotated about its long axis, for example, the apparatus described by U.S. Pat. No. 3,450,598. Such a vessel provides a surface for the attachment of cells as they grow, while at the same time providing the cells ready access to the tissue culture medium as the tube rotates. Alternatively, the cells can be grown to confluency on any suitable, inert solid support supplying a high surface area, for example, glass beads or rods, metal balls such as titanium spheres, or an inert, medium insoluble, organic support such as small spheres or globules of a modified dextran gel such as Sephadex (Pharmacia Fine Chemicals, New York, N.Y.).

In tanks or large flasks the cells can be cultured by the submerged cell suspension method, for example, the methods described by W. R. Cherry and R. N. Hull, J. Biochem. and Microbiol. Tech. and Eng., 2, 267–285 (1960).

When, in the present method, mammalian cells are incubated in the presence of an inert support such as one described above and, preferably, a roller of Flow tube (Flow Laboratories) which provides surface, the cells are grown until a confluent monolayer of cells has been formed on the inert surface. When, however, the growth of the cells is carried out by the cell suspension technique, the cells are allowed to incubate until the maximum population density has been attained as determined by cell count.

According to the method of the present invention, the sterile tissue culture medium is inoculated with a seed culture of a mammalian cell line and the culture is incubated at a temperature between about 20° and about 38° C. and preferably between about 35° and 37° C. Throughout the incubation, the tissue culture medium may be agitated by stirring, rocking, or, in the case of a tubular apparatus, by rotation of the tube. The amount of the seed inoculant varies depending upon such factors as the type of cell employed, the type of vessel used, the volume of medium employed, and the amount of plasminogen activator which is to be produced. Preferably, the amount of inoculum employed is that amount which provides a 10-fold growth of the cells to attain confluency or maximum population density in about 7 to 10 days. A convenient ratio of inoculum to medium for most culture systems is approximately about 1 to $5 \times 10^5$ cells per ml. of medium.

The inoculated medium is then incubated as described above for between about 5 and about 10 days. During the incubation period, periodic changes of medium are desirable so that fresh nutrients are supplied to the cells during their development and metabolic products are washed out or diluted with each medium change. Commonly the cells are incubated for about 1 week, and during this time the medium is changed at 48, 96, and 120 hours. Following the incubation period of approximately one week, which period varies with the type of cell, the cells have attained growth to confluency or maximum population density. During the incubation, the medium is desirably fortified with approximately three percent by volume of mammalian serum.

When confluent cell growth or maximum population density has been attained, the medium is changed again and fresh serum-free medium, for example, medium 199, Waymouth's medium MD 705/1., or other suitable medium containing an antimitotic agent selected from the group consisting of podophylotoxin, colchicine, desacetylcolchicine, desacetamidocolchicine, N-desacetyl-N-methylcolchicine, 4-cyanocolchicine, vincristine, vinblastine, vinblastine N-methylamide and desacetylvinblastine amide. The culture is then incubated for an additional 4 to 14 days. The amount of antimitotic which is added to the culture medium can be varied; however, good results are obtained when between about 0.1 microgram to about 10 micrograms per milliliter of culture medium are employed. A preferred amount of antimitotic is about 1 microgram per milliliter of culture medium when a preferred mammalian cell is employed.

When, in the present method, the incubation of mammalian cells is carried out in a tissue culture medium fortified with fetal bovine serum, it is preferable to replace the edium with a fresh medium fortified with a non-inhibitory serum such as horse serum and continue the incubation for an additional 2 to 3 days before the antimitotic-containing serum-free medium is added. In this manner the previously mentioned deleterious effect of FBS on plasminogen activator production is avoided while yet realizing the beneficial effect of FBS on cell growth. In this instance, the non-inhibitory serum is commonly incorporated in the intervening replacement medium at a concentration of between about 1 percent and 5 percent by volume of the culture medium.

The antimitotic agents employed in the present method are all known compounds which are either plant products or modifications thereof, for example colchicine and desacetylcolchicine. Although all of the above-named antimitotic agents have been referred to as "alkaloids" (*Drill's Pharmacology in Medicine*, 4th Ed., pages 1611–1612, McGraw-Hill Book Company, N.Y. N.Y.), some members of the group, e.g., podophylotoxin and colchicine do not fit within the classical definition, to wit, basic, nitrogenous plant products. Of the above group of agents only vincristine and vinblastine fit the classical definition.

For convenience herein the above-named compounds are referred to as antimitotic agents, or as antimitotics, which term also denotes a common property of the group. In addition, they are all plant derived compounds, some of which have been chemically modified.

Colchicine, N-desacetyl-N-methylcolchicine (demecolcine), podophylotoxin, vincristine and vinblastine are described in *Merck Index*, 8th Ed., at pages 278, 328, 845, 1108, and 1107, respectively. Desacetylcolchicine is described in *J. Amer. Chem. Soc.*, 75, 5292 (1953); desacetamidocolchicine is described in *Tetrahedron Lett.*, 14, 8 (1961); and 4-cyanocolchicine is described in *Justus Liebig's Ann. Chem.*, 62, 105 (1963).

Certain of the antimitotic agents employed in the present method readily form acid addition salts with suitable acids. For example, vincristine, vinblastine and its derivatives form salts with mineral acids such as sulfuric, hydrochloric, hydrobromic and phosphoric acids. Such salts can be used in the method of this invention to enhance the yields of plasminogen activator.

The relevance of the antimitotic activity of the above named compounds to the enhanced yields of plasminogen activator obtained in the present method is not clearly understood at this time. However, the antimitotic activity appears to play a significant role since other compounds structurally similar to colchicine and which do not possess antimitotic activity failed to demonstrate enhancement in the yields of plasminogen activator. Other mitotic poisons, chemically unrelated to plant extracts defined herein do not stimulate the production of plasminogen activator in the present method.

The time at which the antimitotic is added can be varied. For example, it is not essential in the production of plasminogen activator to add colchicine or other antimitotic at the time when the cells have developed to confluency or maximum population density. They can be added prior to such time; however, greater yields of plasminogen activator are commonly obtained when the antimitotic is added to the tissue culture medium when the cells have attained confluency or maximum population density.

The length of time during which the tissue culture cells are incubated in the presence of the antimitotic is determined by assaying small aliquots of the tissue culture medium for the level of plasminogen activator. In this manner, the time at which peak levels of plasminogen activator are present can be determined, the incubation halted, and the activator recovered. After peak levels of plasminogen activator have been reached, a gradual decrease in such levels occurs with time. The assay method employed for the detection and determination of levels of plasminogen activator can be the fibrin plate method of Astrup-Mullertz (The Fibrin Plate Method For Estimating Fibrinolytic Activity, *Arch. Biochem.*, 40, 346, [1967]), or an esterolytic method, for example as described by Walton, *Biochem. Biophys. Acta*, 132, 104 (1967), and by Shury et al., *J. Lab. Clin. Med.*, 64, 145 (1964).

The plasminogen activator produced according to the present method is found in the aqueous nutrient medium, while only inconsequential amounts are found associated with the intact cells and cellular debris. Typically the levels of plasminogen activator attained at the preharvest stage, i.e., following the incubation in the presence of an antimitotic agent, are from about 300 to about 1200 CTA units of activity per ml. or higher with the preferred cell lines. The CTA unit is that unit established by the Committee on Thrombolytic Agents of the National Heart Institute and is based on the activity of urokinase vs. arginyllysine methyl ester.

The plasminogen activator is recovered from the tissue culture medium by first separating the cellular debris and other solids from the tissue culture liquid, and thereafter adsorbing the plasminogen activator on hydroxyapatite. The plasminogen activator is then eluted from the hydroxyapatite and is purified by dialysis, chromatography and gel filtration.

According to the practice of this invention, the tissue culture medium containing the plasminogen activator is filtered, or preferably is centrifuged, to remove cellular debris and other insolubles. In order to effect complete adsorption of plasminogen activator on hydroxyapatite, the separated liquid is diluted with water to adjust the ionic concentration of the liquid to a suitable level. This is accomplished by adjusting the electrical conductivity by dilution of the solution with distilled water to a specific conductance of between about 5 and 8 millimhos. The ionic concentration, as determined by electrical conductivity of the solution, is conveniently measured by means of a London Conductimeter Type CDM 2, cell CDC 101. When the ionic concentration of the filtered plasminogen activator containing solution is thus adjusted, substantially complete adsorption of the plasminogen activator on hydroxyapatite occurs. When the ionic concentration is too high, as demonstrated by a specific conductance of greater than about 8 millimhos, the amount of plasminogen activator adsorbed on hydroxyapatite is less and consequently the amount recovered from the tissue culture medium is reduced.

Following the adjustment of the ionic concentration of the solution, hydroxyapatite is added in an amount sufficient to adsorb the plasminogen activator present. In general, between about 8 and 12 g of hydroxyapatite per liter of plasminogen activator solution is sufficient to adsorb all of the plasminogen activator present in solution. The adsorption is preferably carried out with stirring at a temperature of about 0°–10° C. The cold mixture is preferably stirred for no more than about 2 hours, during which time maximum adsorption occurs under the described conditions. Longer stirring periods of up to 24 hours can be employed but result in decreased adsorption of the activator, although the majority of the activator is recovered. Best adsorption is realized at about 2 hours.

The suspension of hydroxyapatite containing adsorbed plasminogen activator is then filtered, or the supernatant liquid is decanted from the hydroxyapatite. The hydroxyapatite is then washed repeatedly with distilled water and, following each wash, is recovered by either decantation or by filtration. Preferably, although not essentially, the hydroxyapatite is washed with 0.01 molar phosphate buffer at pH 6. After washing, the plasminogen activator is eluted from the hydroxyapatite with 0.7 molar phosphate buffer at pH 6.8. The amount of eluent is not critical and an excess amount can be used to insure complete elution of the plasminogen activator. However, it is desirable in carrying out the elution to maintain the volume of eluent at a minimum to simplify subsequent isolation procedures.

The plasminogen activator-containing eluate thus obtained is cooled to a temperature between about 5° and 15° C. Proteinaceous impurities are salted out from the cold aqueous eluate by adding to the eluate a salt, and preferably an inorganic salt, until the salt concentration is approximately 20 percent of saturation. The proteinaceous impurities form as a precipitate at about this salt concentration and are removed from the cold eluate by filtration. Typical salts which can be used to salt out the impurities include ammonium sulfate, sodium sulfate, ammonium chloride, sodium chloride, ammonium orthophosphate and like sulfate, chloride, and phosphate salts. A preferred salt is ammonium sulfate.

The concentration of the salt in the eluate is then increased to a concentration between about 45 and 55 percent, and typically about 50 percent of saturation, to precipitate the plasminogen activator. Higher salt concentrations of up to about 90 percent of saturation can also be used in the precipitation of activator from the eluate.

Although the plasminogen activator is somewhat purified at this point in the isolation procedure, it is further purified by dialysis to remove inorganic salts and by chromatography. Accordingly, the plasminogen activator precipitated from the eluate is filtered and redissolved in a saline buffer, for example phosphate buffer at between 0.001 and 0.005 M. The buffer solution is then dialyzed at about 0° C. using a cellophane membrane or other suitable membrane against the buffer alone to remove traces of saline and especially the salt used in the salting out process described above.

The dialyzed solution of plasminogen activator in phosphate buffer is then chromatographed over diethylaminoethyl cellulose (DEAE cellulose) to provide further purification of the product.

The chromatography is carried out by passing the plasminogen activator solution over a column packed with DEAE cellulose and thereafter eluting the plasminogen activator from the column with 0.005 molar phosphate buffer. Multiple fractions of eluate are collected and each is assayed to determine the active fractions. The plasminogen activator is eluted from the column in the early fractions, with very minor amounts of the activator being present in later fractions. The later fractions contain predominantly extraneous protein impurities and, due to the minor amount of plasminogen activator present in the later fractions, recovery of additional plasminogen activator from these fractions is unrewarding. The active eluate fractions are combined and the plasminogen activator is precipitated by the addition of a salt to 75 percent of saturation. The preferred salt is ammonium sulfate. The plasminogen activator precipitate is centrifuged and the precipitate dissolved in 0.1 molar tris-hydroxymethylaminomethane (2-amino-2-hydroxymethyl-1,3-propanediol)-0.1 molar potassium chloride, pH 8.0 buffer. The buffered solution is then dialyzed against the same tris-hydroxymethylamino-methane-potassium chloride buffer (tris buffer) to remove phosphate.

The plasminogen activator can be further purified by gen filtration of the dialyzed plasminogen activator solution. This can be accomplished, preferably, by chromatography over a modified dextran gel, for example a cross-linked dextran gel, although other types of gels can be used, for example, an acrylamide or modified acrylamide gel. Sephadex G-150, a modified dextran available from Pharmacia Fine Chemicals, Inc., New York, N.Y. is a preferred gel for further purification of the plasminogen activator. The dialyzed solution is poured into a column packed with the gel and the plasminogen activator is eluted with the same buffer system, as that used in dialysis i.e., 0.1 molar potassium chloride/0.1 molar tris-hydroxymethylaminomethane, pH 8.0. Multiple fractions of eluate are collected and each is assayed for activity. Those fractions demonstrating fibrinolytic activity in the assay are combined. Commonly, the fractions containing the majority of the plasminogen activator are collected from the column after the early fractions which contain proteinaceous material. The combined fractions containing plasminogen activator are then lyophilized or are stored in liquid form.

Based upon the results of analytical determinations carried out thus far, the lyophilized preparation of plasminogen activator prepared as described above, is a highly active plasminogen activator having a purity of approximately 90 percent. The plasminogen activator substance described herein is a water soluble polypeptide having a molecular weight of approximately 30,000 as estimated by gel chromatography on Sephadex G-150 at 25° C. As with most polypeptides, plasminogen activator adsorbs in the U.V. at approximately 280 millimicrons. The absorption of plasminogen activator solutions at 280 m$\mu$ in the U.V. provides a convenient method for expressing the activity of the isolated activator. For example, the activity observed by the fibrin plate method is related to the optical density (OD) in the U.V. at 280; m$\mu$ for a given solution and is expressed as CTA $\mu$/OD$_{280}$.

The plasminogen activator obtained by the process of this invention commonly has activity between about 15,000 and 20,000 CTA $\mu$/OD$_{280}$ or higher.

The plasminogen activator obtained by the process of this invention is useful in the treatment of various thromboembolic conditions when administered by intravenous infusion to a warm-blooded mammal at a non-toxic dose between about 15,000 and 50,000 CTA units per kg. of body weight. The activator is administered in a suitable pharmaceutical form, for example, as an isotonic saline solution. The dose of activator administered may be varied at the discretion of the clinician, depending upon such factors as the severity of the condition, for example the location of the clot as well as its size, the tolerance of the particular host to the activator, and the general health of the particular host. The plasminogen activator can be prepared, owing to its water solubility, in any desired pharmaceutical form recognized in the art as suitable for administration by the intravenous infusion method.

The following examples are provided to further illustrate the present invention.

In the examples which follow, the cell culturing procedures are all carried out using aseptic techniques commonly employed in the tissue culture art. Similarly, all tissue culture media, as well as media used in the preparation of cell cultures for incubation, contain approximately 100 units of sodium penicillin G per ml. and approximately 100 mcg of streptomycin sulfate per ml. to prevent bacterial contamination.

EXAMPLE 1

A frozen culture of pig kidney cells, LLC-PK$_1$ (Hull), ATCC No. Cl 101, containing approximately 1–2×10$^6$ cells was thawed in a 37° C. water bath and the cells were suspended in 10 ml. of medium 199 containing 2 percent glycerol. The suspension was centrifuged and the supernatant was discarded. The cells were resuspended in medium 199 containing three percent horse serum and again centrifuged. The cells thus washed and prepared for incubation were then suspended in 30 ml. of medium 199 containing three percent horse serum and the cell suspension was incubated at a temperature of 35° to 37° C. for 7 days. The incubation was carried out in a 16 oz. culture bottle having two flat sides. During the period of incubation the medium was replaced at 48 hour intervals until the cells had formed a confluent sheet covering the surface of the incubator bottle exposed to the growing cells.

When confluency was reached, the medium was decanted and 10 ml of medium 199 containing 0.2 percent crystalline trypsin were added to the culture bottle. The cells, immersed in the trypsin-containing medium, were incubated for one to three minutes and thereafter the incubator bottle was inverted and incubation was continued for five minutes. The trypin-containing medium was removed from the bottle and 10 ml of fresh medium 199 fortified with 3 percent horse serum were added. The bottle was gently agitated to dislodge the cells from the incubator surface, thereby providing a cell suspension which was centrifuged. Following centrifugation, the cells were suspended in 30 ml. of medium 199 containing three percent horse serum and a cell count was made by withdrawing a small (1 ml.) aliquot from the suspension. The cell suspension was then diluted with medium 199 fortified with three percent horse serum to obtain a cell suspension having a cell count of about 1 to 5 × 10$^5$ cells per ml. of medium.

The cell suspension prepared as described above was then employed as the inoculum for planting 10 additional 16 oz. culture bottles. Each of the ten cultures were then incubated and the growth process carried out to confluence as described above for the development of the first cell population.

Upon achievement of confluency of the cells in each of these bottles, the trypsin-containing medium was again used in the manner described above to disaggregate the cells. The cell suspensions were pooled and then were centrifuged. The cells were resuspended in medium 199 fortified with 3 percent FBS, cell counts were made, and the pooled suspensions were diluted with additional medium to obtain an inoculum having 10$^5$ cells per ml of medium.

One hundred milliliters of the cell suspensions were charged into each of ten glass Flow tubes measuring 685 mm in length and 64 mm in diameter, and the cultures were incubated at a temperature of 35° to 37° C. The tubes were rotated continually along the horizontal axis.

During the incubation the medium was replaced with 100 ml. of fresh medium 199 fortified with three percent fetal bovine serum at two days and again at five days from the start of the tube incubation. After seven days incubation, the cells in each tube had grown to confluence on the tube surface.

The fetal bovine serum-containing-medium, used during the growth to confluence, was replaced in each tube with 100 ml. of medium 199 fortified with three percent horse serum and incubation was continued for two days. Thereafter the medium was drawn off each tube and was replaced with 100 ml. of serum free medium 199 containing 1 mcg of colchicine per ml. of medium. The incubation was continued, and periodically a small aliquot of the medium was withdrawn and assayed for plasminogen activator titer. After nine days of incubation, peak titers were obtained and the confluent cellular sheet attached to the tube surface had started to disintegrate. Incubation was discontinued and the plasminogen activator produced was recovered from the tissue culture medium of each culture tube in the following manner.

The contents of each incubator tube were centrifuged to spin down cells and cellular debris, and the supernatant was siphoned off. The media supernatants were combined to provide a total volume of approximately 1 liter.

The pooled plasminogen activator-containing supernatant was diluted with one liter of distilled, low conductivity water to attain a solution having a specific conductance of eight millimhos as determined with a conductimeter (London Conductimeter, Type CDMZ, cell CDC104).

To the diluted solution were added 10 g of purified hydroxyapatite and the mixture was stirred for two hours at room temperature. Thereafter, the hydroxyapatite was allowed to settle and the supernatant medium was decanted. The hydroxyapatite was washed twice with 100 ml. portions of water and then once with 100 ml. of 0.01 molar phosphate buffer, pH 6.0.

The plasminogen activator was then eluted from the washed hydroxyapatite by stirring a suspension of the adsorbent in 500 ml. of 0.7 molar phosphate buffer, pH 6.8. The suspension was stirred at room temperature for 2 hours, during which time quantitative elution of the plasminogen activator was realized.

The eluate was cooled to about 5° C. and ammonium sulfate was added to the eluate until a salt concentration of 20 percent of saturation was reached. The polypeptide precipitate which formed was separated from the plasminogen activator-containing liquid phase by means of a centrifuge.

To the liquid phase was added additional ammonium sulfate until the salt concentration was about 50 percent of saturation. Impure plasminogen activator precipitated from the salt solution and was separated and obtained as an impure solid by centrifugation. The impure plasminogen activator was dissolved in 0.001 molar phosphate buffer, pH 6, and the solution was dialyzed against aqueous buffer alone using a cellophane membrane.

The dialyzed buffer solution of impure plasminogen activator was then chromatographed over DEAE cellulose (diethylaminoethyl cellulose). The chromatography was carried out by pouring the dialyzed solution of the plasminogen activator onto a column packed with the adsorbent which had been equilibrated with 0.001 molar phosphate buffer, pH 6, and collecting multiple fractions. The eluate fractions were monitored for ultraviolet absorption at 280 m$\mu$. When, as indicated by an absence of absorption at 280 m$\mu$ in the UV, the eluate contained no further plasminogen activator, the column was eluted further with 0.005 molar phosphate buffer diluted with an equal volume of one molar sodium chloride. Multiple fractions of eluate were collected, and those showing absorption at 280 m$\mu$ in the ultraviolet were combined with the eluate fractions obtained with the first eluent and the pooled eluate was lyophilized.

The freeze dried preparation of purified plasminogen activator was dissolved in a minimum volume of a mixture of equal volumes of 0.1 molar tris and 0.1 molar potassium chloride, pH 8. The solution was dialyzed against the same 0.1 M tris/0.1 molar KCl solution to remove phosphate carried over in the lyophile preparation from the DEAE cellulose chromatography.

The dialyzed solution of plasminogen activator was then chromatographed over a column packed with Sephadex G-150 in 0.1 M tris/0.1 M KCl, pH 8. The plasminogen activator was eluted from the column with the same buffer solution of 0.1 M tris/0.1 M KCl, pH 8 and multiple fractions were collected. Each fraction was assayed in the UV and by the fibrin plate method to determine the active fractions. The later fractions which contained the plasminogen activator were combined and lyophilized to obtain 20 mg of a dry amorphous powder having about 350,000 CTA units of plasminogen activator activity.

EXAMPLE 2

Following the procedures and the techniques described in Example 1, a frozen culture of the porcine kidney cell line, PK (15), ATCC No. CCL 33 PK (15), is grown to confluency in medium 199 fortified with horse serum. The cells are then incubated for about 10 days in serum free medium 199 containing 1 mcg/ml. of vinblastine to produce plasminogen activator. The activator is recovered from the tissue culture medium and is isolated and purified by the salting-out procedures and the chromatographic methods described in Example 1.

EXAMPLE 3

Following the culturing procedures of Example 1, cells of the porcine kidney cell line, LLC-PK$_1$ (Hull), ATCC No. CL 101, are grown to confluency in culture tubes in medium 199 containing horse serum. Thereafter the cells are incubated for about 10 days in serum free medium 199 containing 1 mcg/ml. of vincristine and the plasminogen activator produced is recovered and purified according to the methods described in Example 1.

EXAMPLE 4

Following the culturing procedures of Example 1, cells of rhesus monkey kidney cell line, LLC-MK$_2$ (Hull), ATCC No. CCL 7, are grown to confluency in medium 199 containing 1% horse serum. The medium is replaced with serum free medium 199 containing 1 mcg/ml. of demecolcne and incubation is continued for about 9 days to produce plasminogen activator which is recovered and purified by the method of Example 1.

EXAMPLE 5

A frozen culture of the porcine kidney cell line, LLC-PK$_{1A}$, ATCC No. CL 101.1, is thawed in a 37° C. water bath and the cells are washed and prepared for incubation by first suspending the cells in Waymouth's medium MD 705/1 containing two percent glycerol. The cell suspension is centrifuged and the cells are then resuspended in the same medium containing three percent pig serum. The cell suspension is centrifuged and the washed cells are used as the inoculum for 50 ml. of sterile Waymouth's medium MD 705/1 containing three percent pig serum. The culture medium is then incubated at a temperature of 35° to 37° C. in a 100 ml. Spinner or stirred flask. The culture is incubated for between 5 and 7 days with continual agitation and periodic gasing with 5% $CO_2$ in air until the maximum cell population density (3–5 × $10^6$ cells/ml.) as determined by cell count is achieved.

The cell suspension is centrifuged to remove spent medium and the cells are suspended in 300 ml. of Waymouth's medium MD 705/1 containing 3 percent pig serum to achieve a cell density of about 1 to 5 × $10^5$ cells per ml of culture medium. The cell suspension is then incubated in a one liter Spinner flask as before with continual agitation and periodic gasing at 35° to 37° C. The culture is centrifuged to remove spent medium which is decanted from the spun down cell population.

The above incubation in fortified medium is repeated with fresh medium each time until growth through 3 to 5 population doublings has occurred, resulting in cell densities of about 3 to 6 × $10^6$ cells/ml.

The cells are immediately resuspended in the same volume of serum free Waymouth's medium MD 705/1 containing 1 mcg/ml. of colchicine to maintain the same cell density as above.

The cells are then incubated in the colchicine containing medium for up to 14 days at 37° C. with continual agitation. During the latter incubation in the presence of colchicine, the amount of plasminogen activator present in the culture is determined by assaying a small aliquot for fibrinolytic activity. Peak titers of plasminogen activator appear to occur between about 10 and 14 days from the start of incubation.

The cell culture is centrifuged and the plasminogen activator contained in the supernatant medium is recovered and purified by following the salting out, dialysis, and chromatographic methods of isolation and purification described in Example 1.

We claim:

1. The method of producing plasminogen activator which comprises:
   a. culturing plasminogen activator producing mammalian cells in an aqueous nutrient tissue culture medium containing assimilable sources of nitrogen, carbon and inorganic salts;
   b. further culturing said cells in an aqueous nutrient tissue culture medium containing between 0.1 and 10 mcg/ml. of an antimitotic agent selected from the group consisting of podophylotoxin, colchicine, desacetylcolchicine, desacetamidocolchicine, N-desacetyl-N-methylcolchicine, 4-cyanocolchicine, vincristine, vinblastine, vinblastine N-methylamide and desacetylvinblastine amide until a substantial amount of plasminogen activator is present in said medium; and
   c. recovering the plasminogen activator from said tissue culture medium.

2. The method of claim 1 wherein the antimitotic is colchicine.

3. The method of claim 1 wherein the antimitotic is N-desacetyl-N-methylcolchicine.

4. The method of claim 1 wherein the antimitotic is vinblastine.

5. The method of claim 1 wherein the antimitotic is vincristine.

6. The method of claim 1 wherein the mammalian cells are cultured in the presence of an inert solid support to form a culture of confluent cells on said support.

7. The method of claim 1 wherein the mammalian cells are cultured to maximum population density in a submerged cell suspension culture.

8. The method of claim 6 in which the mammalian cells are porcine kidney cells PK (15), ATCC No. CCL 33 PK (15).

9. The method of claim 6 in which the mammalian cells are porcine kidney cells LLC-PK, (Hull), ATCC No. CL 101.

10. The method of claim 6 in which the mammalian cells are rabbit kidney cells LLC-RK$_1$ (Hull), ATCC No. CCL 106.

11. The method of claim 6 in which the mammalian cells are rhesus monkey kidney cells LLC-MK$_2$ (Hull), ATCC No. CL 7.

12. The method of claim 6 in which the mammalian cells are rhesus monkey kidney cells LLC-MK$_2$, ATCC No. CCL 7.1.

13. The method of claim 6 in which the mammalian cells are porcine kidney cells LLC-PK$_{1A}$, ATCC No. CL 101.1.

14. The method of claim 8 in which the antimitotic is colchicine.

15. The method of claim 9 in which the antimitotic is vincristine.

16. The method of claim 10 in which the antimitotic is vinblastine.

17. The method of claim 11 in which the antimitotic is vinblastine N-methylamide.

18. The method of claim 12 in which the antimitotic is desacetylcolchicine.

19. The method of claim 7 in which the mammalian cells are porcine kidney cells PK (15), ATCC No. CCL 33 PK (15).

20. The method of claim 7 in which the mammalian cells are porcine kidney cells LLC-PK$_{1A}$, ATCC No. CL 101.1.

21. The method of claim 19 in which the antimitotic is colchicine.

22. The method of claim 20 in which the antimitotic is colchicine.

23. The method of recovering plasminogen activator in a purified form from the plasminogen activator containing culture medium of claim 1 which comprises;
   a. separating insolubles from the aqueous tissue medium containing plasminogen activator;

b. diluting the separated medium with distilled water to adjust the specific conductance of said medium to 8 millimhos or less;
c. contacting said plasminogen activator containing medium for between 1 and 24 hours with between 8 and 12 g of hydroxyapatite per liter of medium;
d. separating the hydroxyapatite containing adsorbed plasminogen activator from said medium;
e. washing said hydroxyapatite;
f. eluting said plasminogen activator from the washed hydroxyapatite with 0.7 M phosphate buffer at pH 6.8;
g. adding to the plasminogen activator containing eluate a water soluble inorganic salt in an amount sufficient to achieve a salt concentration of approximately 20 percent of saturation;
h. separating the precipitated impurities from said eluate;
i. adding to said eluate an additional amount of said salt to achieve a salt concentration of between approximately 45 and 90 percent of saturation;
j. separating the precipitated plasminogen activator from said salt containing eluate;
k. dissolving the plasminogen activator in phosphate buffer having a molarity of between approximately 0.001 and 0.005 and dialyzing said buffer solution;
l. contacting the dialyzed solution of plasminogen activator with diethylaminoethyl cellulose adsorbent;
m. eluting the adsorbed plasminogen activator from said adsorbent with 0.005 molar phosphate buffer;
n. adding to the plasminogen activator containing eluate a water soluble inorganic salt in an amount sufficient to achieve a salt concentration of approximately 75 percent of saturation;
o. separating the precipitate of plasminogen activator;
p. dissolving the plasminogen activator in 0.1 M tris-hydroxymethylaminomethane: 0.1 M potassium chloride buffer, pH 8.0 and dialyzing the buffer against said buffer alone;
q. contacting the dialyzed buffer solution with a modified dextran gel;
r. eluting the adsorbed plasminogen activator from said gel with 0.1 M tris-hydroxymethylaminomethane: 0.1 M potassium chloride, pH 8.0 buffer; and
s. lyophilizing the plasminogen activator containing eluate to obtain in a purified solid form the plasminogen activator.

24. The method of claim 23 in which the water soluble inorganic salt is ammonium sulfate.

* * * * *